US012655885B2

(12) United States Patent　　(10) Patent No.:　US 12,655,885 B2

Takayanagi　　(45) Date of Patent:　Jun. 16, 2026

(54) STEERING DEVICE

(71) Applicant: Hitachi Astemo, Ltd., Hitachinaka (JP)

(72) Inventor: Naoki Takayanagi, Hitachinaka (JP)

(73) Assignee: HITACHI ASTEMO, LTD.,
　　　　　　Hitachinaka (JP)

( * ) Notice: Subject to any disclaimer, the term of this
　　　　　patent is extended or adjusted under 35
　　　　　U.S.C. 154(b) by 585 days.

(21) Appl. No.: 18/024,669

(22) PCT Filed: Aug. 17, 2021

(86) PCT No.: PCT/JP2021/029989
　　　§ 371 (c)(1),
　　　(2) Date: Mar. 3, 2023

(87) PCT Pub. No.: WO2022/059403
　　　PCT Pub. Date: Mar. 24, 2022

(65) Prior Publication Data

US 2023/0250860 A1　　Aug. 10, 2023

(30) Foreign Application Priority Data

Sep. 18, 2020　　(JP) ................................. 2020-156843

(51) Int. Cl.
　　*B62D 7/22*　　　　(2006.01)
　　*B62D 3/12*　　　　(2006.01)
　　*F16F 3/087*　　　(2006.01)
　　*F16F 15/08*　　　(2006.01)
(52) U.S. Cl.
　　CPC ................ *F16F 15/08* (2013.01); *B62D 3/12*
　　　　(2013.01); *F16F 3/0876* (2013.01)

(58) Field of Classification Search
　　CPC .. B62D 7/22; B62D 7/226; B62D 3/12; F16F
　　　　　　15/02; F16F 15/08; F16F 3/0876; F16F
　　　　　　1/3821; F16F 1/3863; F16F 1/3835; F16F
　　　　　　　　　　　　　　　　　　　　　　　7/104
　　See application file for complete search history.

(56) References Cited

U.S. PATENT DOCUMENTS 5,110,081 A　*　5/1992　Lang, Jr. ............... F16F 3/0873
　　　　　　　　　　　　　　　　　　267/293
5,183,286 A　*　2/1993　Ayabe ...................... B60G 7/02
　　　　　　　　　　　　　　　　　　280/124.144

(Continued)

FOREIGN PATENT DOCUMENTS

JP　　　2019-051828 A　　4/2019

OTHER PUBLICATIONS

International Preliminary Report on Patentability and Written Opinion dated Nov. 2, 2021 issued in International Application No. PCT/JP2021/029989, with English translation, 7 pages.

(Continued)

*Primary Examiner* — James A English

(74) *Attorney, Agent, or Firm* — FOLEY & LARDNER LLP

(57) ABSTRACT

In an insulator inserted in an insulator accommodation hole of a bracket body portion, an inclined portion is formed in an inner periphery of a first cylindrical body portion of a first core metal, the inclined portion being provided anterior to an internal thread portion in an inserting direction of a bolt and reduced in diameter toward the rear side in the inserting direction.

10 Claims, 5 Drawing Sheets

(56)         References Cited

U.S. PATENT DOCUMENTS

| | | | |
|---|---|---|---|
| 6,189,902 B1 * | 2/2001 | Lenzen, Jr. ........... | F16B 5/0258 |
| | | | 280/93.515 |
| 6,666,438 B2 * | 12/2003 | Nakagawa ............ | F16F 1/3814 |
| | | | 267/141.2 |
| 8,523,206 B2 * | 9/2013 | Degenstein .............. | B62D 3/12 |
| | | | 180/428 |
| 12,037,064 B2 * | 7/2024 | Weisbruch ........... | B62D 55/213 |
| 2008/0230676 A1 * | 9/2008 | Hansemann .......... | F16F 1/3842 |
| | | | 248/634 |
| 2017/0225708 A1 * | 8/2017 | Lee ........................ | B62D 7/226 |
| 2018/0273088 A1 * | 9/2018 | Offerle .................... | B62D 3/12 |

OTHER PUBLICATIONS

International Search Report dated Nov. 2, 2021 issued in International Application No. PCT/JP2021/029989, with English translation, 5 pages.

* cited by examiner

STEERING DEVICE

TECHNICAL FIELD

The invention relates to steering devices.

BACKGROUND ART

Patent Literature 1 teaches that a bracket portion is provided in a gear housing accommodating a rack bar and discloses technology to fix the gear housing to a vehicle body through the bracket portion. The bracket portion includes an insulator accommodation hole in which an insulator for vibration insulation is inserted. The gear housing is fastened to a fixed portion of the vehicle body with a bolt through the insulator.

CITATION LIST

Patent Literature

PTL 1: Japanese Unexamined Patent Application Publication (Kokai) No. 2019-51828

SUMMARY OF INVENTION

Technical Problem

The technology disclosed in Patent Literature 1 involves a problem that, when the bolt is inserted into the insulator at the installation of the gear housing in the vehicle body, the bolt thrusts and pushes up the insulator from the bracket portion by its distal end, attributable to a relative inclination of the bolt to the insulator, which makes the bolt spin around.

An object of the invention is to provide a steering device that is capable of restraining the thrusting of the bolt against the insulator.

Solution to Problem

In the steering device according to one embodiment of the invention, a reduced diameter portion is formed in an inner periphery of a cylindrical body portion of a core metal. The reduced diameter portion is located anterior to an internal thread portion in the bolt-inserting direction and extends toward the rear side in the bolt-inserting direction.

The one embodiment of the invention thus can restrain the thrusting of the bolt against the insulator.

DESCRIPTION OF EMBODIMENTS

Embodiment 1

Figure 1:
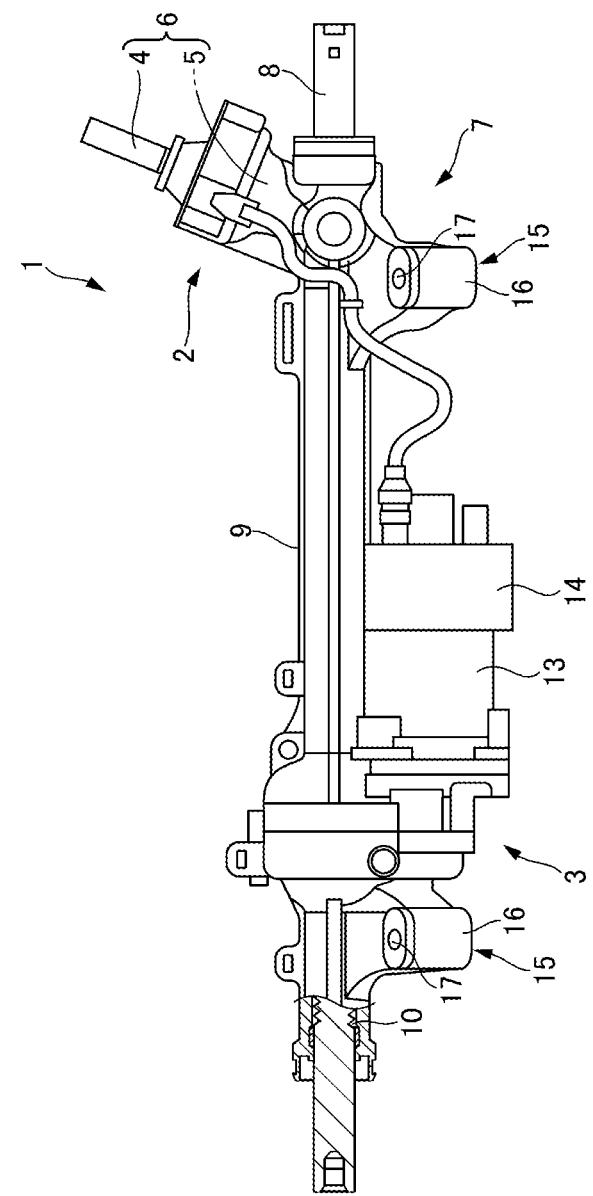
FIG. 1 is a schematic view of a steering device 1 of Embodiment 1.

FIG. 1 is a schematic view of a steering device 1 of Embodiment 1. FIG. 1 includes a partial cross-section of one end side of a gear housing 9.

The steering device 1 comprises a steering mechanism 2 and a steering assist mechanism 3. The steering mechanism 2 transmits a steering force from a driver. The steering assist mechanism 3 assists a steering operation by the driver. The steering mechanism 2 mechanically links a steering wheel, not shown, with two turned wheels, not shown. The steering wheel is arranged inside an operator's cabin of a vehicle. The two turned wheels are front wheels of the vehicle. The steering mechanism 2 includes a steering shaft 6 and a transmission mechanism 7. The steering shaft 6 includes an input shaft 4 and an output shaft 5. A rotating force from the steering wheel is transmitted to the input shaft 4. The output shaft 5 is connected to the input shaft 4 via a torsion bar, not shown. The transmission mechanism 7 transmits the rotation of the steering shaft 6 to the turned wheels.

The transmission mechanism 7 is a rack-and-pinion mechanism comprising a rack and a pinion. The pinion is provided on an outer periphery of the output shaft 5. The rack is provided on an outer periphery of a rack bar 8. Both ends of the rack bar 8 are linked with the respective turned wheels via tie rods, not shown, and knuckle arms, not shown. The rack bar 8 is accommodated in a rack bar accommodating portion 10 that is provided inside the gear housing 9 having an elongated cylinder-like shape.

The steering assist mechanism 3 comprises a motor 13 which is an electric motor that imparts a steering force to the steering mechanism 2. The motor 13 is configured integrally with an electric control unit (ECU) 14. The electric control unit 14 has a function to store and carry out various kinds of control processing. The electric control unit 14 performs drive control on the motor 13 according to a steering torque signal from a torque sensor, not shown, or the like.

Figure 2:
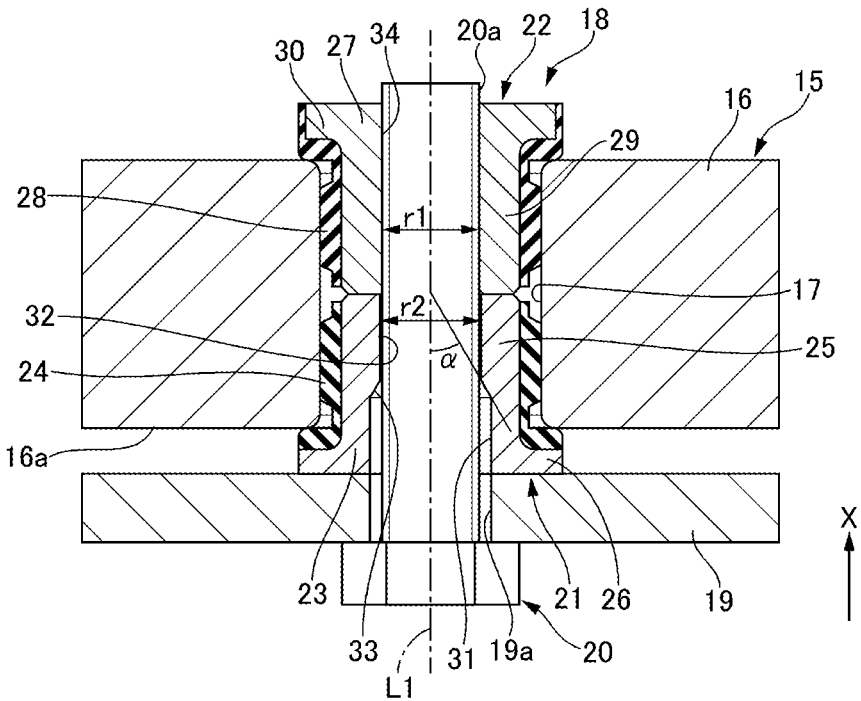
FIG. 2 is a longitudinal sectional view of a bracket portion 15 of Embodiment 1.

A bracket portion 15 for attaching the gear housing 9 to a vehicle body is provided at each end of the gear housing 9 in an axial direction. As illustrated in FIG. 2, the bracket portion 15 includes a bracket body portion 16 and an insulator accommodation hole 17. The bracket body portion 16 is provided at the outer side of the rack bar accommodating portion 10. The insulator accommodation hole 17 is a through-hole having a circular section, which extends through the bracket body portion 16 in a vertical direction. An insulator 18 is inserted in the insulator accommodation hole 17. The gear housing 9 is fastened to a fixed portion 19 of the vehicle body with a bolt 20 through the insulator 18.

The configuration of the insulator 18 of Embodiment 1 is discussed below.

FIG. 2 is a longitudinal sectional view of the bracket portion 15 of Embodiment 1. L1 is an axis line extending through the center of the insulator accommodation hole 17. In FIG. 2, the upper side of the paper is a vertical upper side, and the lower side of the paper is a vertical lower side. The axis line L1 extends in the vertical direction. Hereinafter, a direction along the axis line L1 is referred to as an X-axis; a direction from the vertical lower side toward the vertical upper side is referred to an X-axis positive direction; and the opposite direction is referred to as an X-axis negative direction. A radiation direction of the axis line L1 is referred to as a radial direction.

The insulator 18 of Embodiment 1 includes a first insulator 21 and a second insulator 22. The first insulator 21 is located at an X-axis negative direction side of the second insulator 22. The first insulator 21 includes a first core metal 23 and a first elastic body 24. The first core metal 23 is made of metal material and includes a first cylindrical body portion 25 and a first flange portion 26. The first cylindrical body portion 25 is formed to have a cylindrical shape. The first cylindrical body portion 25, except an X-axis negative direction end, is accommodated in the insulator accommodation hole 17. The center of the first cylindrical body portion 25 is on the axis line L1. The first flange portion 26 protrudes from the X-axis negative direction end of the first cylindrical body portion 25 in a radially outward direction. The first flange portion 26 is in abutment with the fixed portion 19 of the vehicle body. The flange portion 26 has an external diameter that is larger than an internal diameter of the insulator accommodation hole 17. The first elastic body 24 is made of elastic material, such as rubber, and radially interposed between the bracket body portion 16 and the first cylindrical body portion 25 in an elastically deformed state. The first insulator 21 is restrained from falling off the bracket body portion 16 by friction resistance against the bracket body portion 16 which is produced by the elastic deformation of the first elastic body 24.

The second insulator 22 includes a second core metal 27 and a second elastic body 28. The second core metal 27 is made of metal material and includes a second cylindrical body portion 29 and a second flange portion 30. The second cylindrical body portion 29 is formed to have a cylindrical shape. The second cylindrical body portion 29, except an X-axis positive direction end, is accommodated in the insulator accommodation hole 17. The center of the second cylindrical body portion 29 is on the axis line L1. An X-axis negative direction end of the second cylindrical body portion 29 is in abutment with the X-axis positive direction end of the first cylindrical body portion 25. The second flange portion 30 protrudes from the X-axis positive direction end of the second cylindrical body portion 29 in the radially outward direction. The second flange portion 30 has an external diameter that is larger than the internal diameter of the insulator accommodation hole 17. The second elastic body 28 is made of elastic material, such as rubber, and radially interposed between the bracket body portion 16 and the second cylindrical body portion 29 in the elastically deformed state. The second insulator 22 is restrained from falling off the bracket body portion 16 by friction resistance against the bracket body portion 16 which is produced by the elastic deformation of the second elastic body 28.

A first straight portion 31, a second straight portion 32, and an inclined portion 33 are formed in an inner periphery of the first cylindrical body portion 25. The first straight portion 31 is provided on an X-axis negative direction side of the first cylindrical body portion 25. The second straight portion 32 is provided on an X-axis positive direction side of the first cylindrical body portion 25. The second straight portion 32 has a smaller internal diameter than the first straight portion 31. The first straight portion 31 and the second straight portion 32 extend in a direction along the axis line L1. The inclined portion 33 is provided between the first straight portion 31 and the second straight portion 32 in the X-axis direction to connect the first straight portion 31 and the second straight portion 32. The inclined portion 33 has a tapered shape that is reduced in diameter in the X-axis positive direction. The inclined portion 33 has inclination angle α to the axis line L1 which is set smaller than 45 degrees. The inclined portion 33 is provided at the X-axis positive direction side of an X-axis negative direction-side end face 16a of the bracket body portion 16.

An internal thread portion 34 is formed in an inner periphery of the second cylindrical body portion 29 so as to extend from the X-axis negative direction end to the X-axis positive direction end of the second cylindrical body portion 29. The internal thread portion 34 is engaged with an external thread portion 20a of the bolt 20. The internal thread portion 34 has root diameter r1 that is set smaller than internal diameter r2 of the second straight portion 32.

A method of fixing the gear housing 9 to the fixed portion 19 of the vehicle body is now discussed.

Formed in the fixed portion 19 is a through-hole 19a in which the bolt 20 is inserted. The bolt 20 is inserted into the through-hole 19a from a vertically lower side (X-axis negative direction side) of the fixed portion 19 using equipment and extends through the fixed portion 19 to be inserted into the first insulator 21 and the second insulator 22. The external thread portion 20a of the bolt 20 is engaged with the internal thread portion 34 of the second insulator 22, so that the second insulator 22 serves as a nut. The bolt 20 is then tightened, to thereby firmly fasten the bracket body portion 16 and the fixed portion 19 together. The gear housing 9 is thus fixed to the vehicle body. The bolt 20 may be temporarily tightened by a worker and fully tightened thereafter using equipment.

Conventional insulators have a problem that, if a bolt is inclined to an insulator when inserted into the insulator, an external thread portion of the bolt fails to be engaged with an internal thread portion of the insulator, so that the bolt thrusts and pushes up the insulator by the distal end thereof and spins around. Particularly in insulators of an upper and lower split type, the thrusting against the upper insulator notably occurs.

Unlike such insulators, in the insulator 18 of Embodiment 1, the inclined portion 33 is formed in the inner periphery of the first cylindrical body portion 25 of the first core metal 23 so as to be provided anterior to (on the X-axis negative direction side of) the internal thread portion 34 in the inserting direction of the bolt 20, the inclined portion 33 being reduced in diameter toward a rear side (X-axis negative direction side) in the inserting direction of the bolt 20. A distal end of the bolt 20 abuts on the inclined portion 33 before the bolt 20 reaches the internal thread portion 34, and is therefore guided to the center of the internal thread portion 34. This restrains the inclination of the bolt 20 to the second insulator 22. Consequently, the engageability of the external thread portion 20a with the internal thread portion 34 is improved, which can restrain the thrusting of the bolt 20 against the second insulator 22.

In the X-axis direction, the second straight portion 32 is provided in the inner periphery of the first cylindrical body portion 25 and of the second cylindrical body portion 29 to be located between the internal thread portion 34 and the inclined portion 33. The inclination of the bolt 20 is therefore restricted by the internal diameter of the second straight portion 32 after the distal end of the bolt 20 is guided by the inclined portion 33 to the center of the internal thread portion 34. This effectively can restrain the inclination of the bolt 20 to the second insulator 22.

The inclination angle α of the inclined portion 33 to the inserting direction of the bolt 20 is set smaller than 45 degrees. If the inclination angle α is steep (larger than 45 degrees), the bolt 20 might get caught on the inclined portion 33 and fail to be inserted. Since the inclination angle α is gentle (smaller than 45 degrees), the bolt 20 can be restrained from getting caught on the inclined portion 33.

The root diameter r1 of the internal thread portion 34 is set smaller than the internal diameter of the second straight portion 32. If r1 is larger than r2, the second straight portion 32 might interfere with the bolt 20 during the insertion of the bolt 20, whereas if r1 is set smaller than r2, the interference between the bolt 20 and the second straight portion 32 can be restrained.

In the inserting direction of the bolt 20, the inclined portion 33 is provided on the front side (X-axis positive direction side) in the inserting direction in the bracket body portion 16. In other words, after the bolt 20 is fully inserted in the first cylindrical body portion 25 (in the first straight portion 31), the bolt 20 is brought into abutment with the inclined portion 33. This makes it possible to guide the distal end portion of the bolt 20 to the center of the internal thread portion 34 while the inclination of the bolt 20 is restricted by the internal diameter of the first straight portion 31, so that the inclination of the bolt 20 to the second insulator 22 can be effectively restrained.

Embodiment 2

Embodiment 2 has a similar basic configuration to Embodiment 1. The following discussion therefore only explains differences from Embodiment 1.

Figure 3:
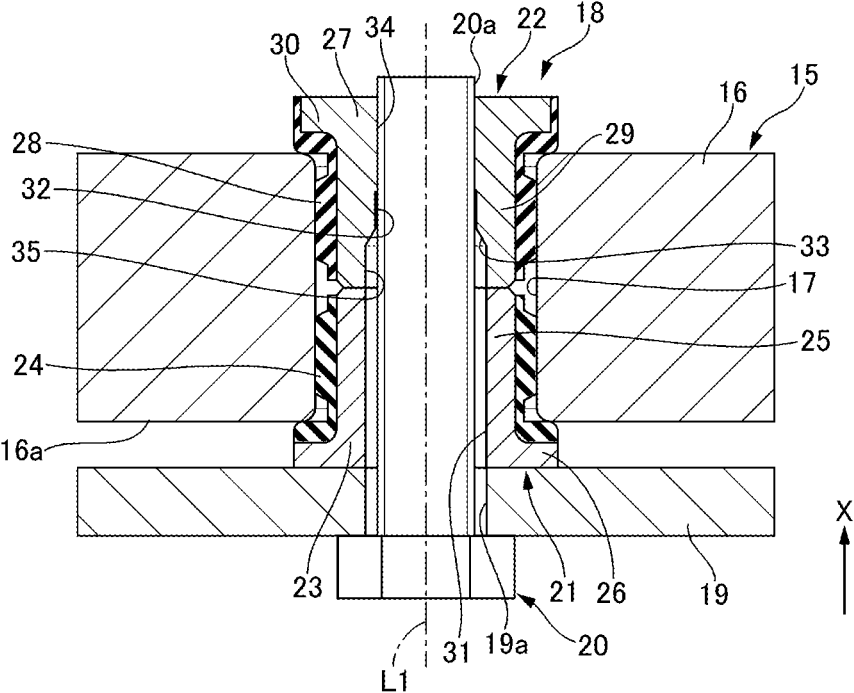
FIG. 3 is a longitudinal sectional view of a bracket portion 15 of Embodiment 2.

FIG. 3 is a longitudinal sectional view of a bracket portion 15 of Embodiment 2.

A first straight portion 31 is provided in an inner periphery of a first cylindrical body portion 25 so as to extend from an X-axis negative direction end to an X-axis positive direction end of the first cylindrical body portion 25. A third straight portion 35, an inclined portion 33, a second straight portion 32, and an internal thread portion 34 are provided in an inner periphery of the second cylindrical body portion 29 in the order mentioned from an X-axis negative direction side toward an X-axis positive direction side. The third straight portion 35 has a similar internal diameter to the first straight portion 31 and is concentric with the first straight portion 31.

In Embodiment 2, the internal thread portion 34 and the inclined portion 33 are provided in the second cylindrical body portion 29. In other words, the inclined portion 33 is provided in the second cylindrical body portion 29 itself in which the internal thread portion 34 is provided, so that a relative inclination of the bolt 20 and the second insulator 22 can be effectively restrained.

Embodiment 3

Embodiment 3 has a similar basic configuration to Embodiment 1. The following discussion therefore only explains differences from Embodiment 1.

Figure 4:
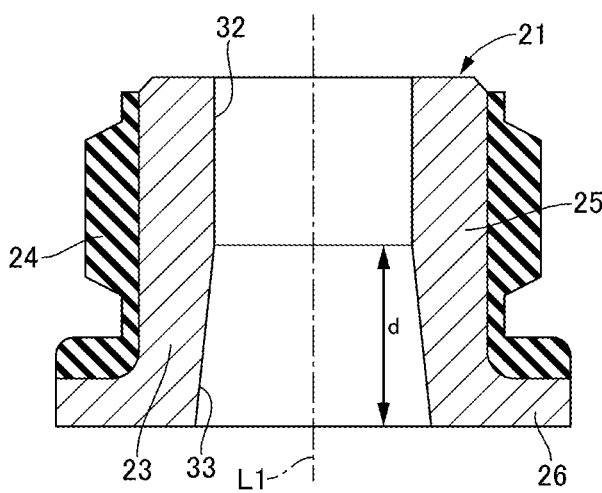
FIG. 4 is a longitudinal sectional view of a first insulator 21 of Embodiment 3.

FIG. 4 is a longitudinal sectional view of a first insulator 21 of Embodiment 3.

Provided in an inner periphery of a first cylindrical body portion 25 are an inclined portion 33 and a second straight portion 32. The inclined portion 33 has length d in an X-axis direction which is set equal to or larger than half the entire length of the first cylindrical body portion 25. This makes an inclination angle α of the inclined portion 33 to an inserting direction of the bolt 20 very gentle and can effectively restrain the bolt 20 from getting caught on the inclined portion 33.

Embodiment 4

Embodiment 4 has a similar basic configuration to Embodiment 1. The following discussion therefore only explains differences from Embodiment 1.

Figure 5:
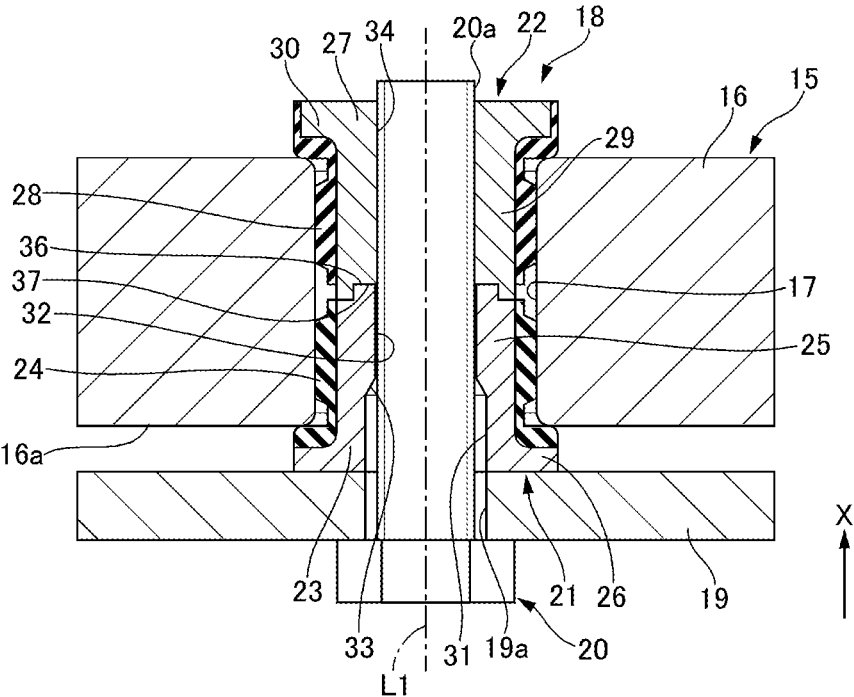
FIG. 5 is a longitudinal sectional view of a bracket portion 15 of Embodiment 4.

FIG. 5 is a longitudinal sectional view of a bracket portion 15 of Embodiment 4.

A convex portion (first fitted portion) 36 is provided at an X-axis positive direction end of a first cylindrical body portion 25. The convex portion 36 is protruding in an X-axis positive direction. Provided in an X-axis negative direction end of a second cylindrical body portion 29 is a concave portion (second fitted portion) 37 that is recessed in the X-axis positive direction. The convex portion 36 is fitted to the concave portion 37.

In Embodiment 4, due to the fitting of the convex portion 36 and the concave portion 37, a first insulator 21 and a second insulator 22 are radially positioned in an abutting state. This can restrain the misalignment of the center of the first insulator 21 and the center of the second insulator 22, to thereby effectively restrain the bolt 20 from thrusting the second insulator 22. The bolt 20 might get caught on a fitted portion if the concave portion 37 and the convex portion 36 are provided in the first cylindrical body portion 25 and the second cylindrical body portion 29, respectively. Since the convex portion 36 and the concave portion 37 are provided in the first cylindrical body portion 25 and the second cylindrical body portion 29, respectively, the bolt 20 can be restrained from getting caught on the fitted portion.

Embodiment 5

Embodiment 5 has a similar basic configuration to Embodiment 1. The following discussion therefore only explains differences from Embodiment 1.

Figure 6:
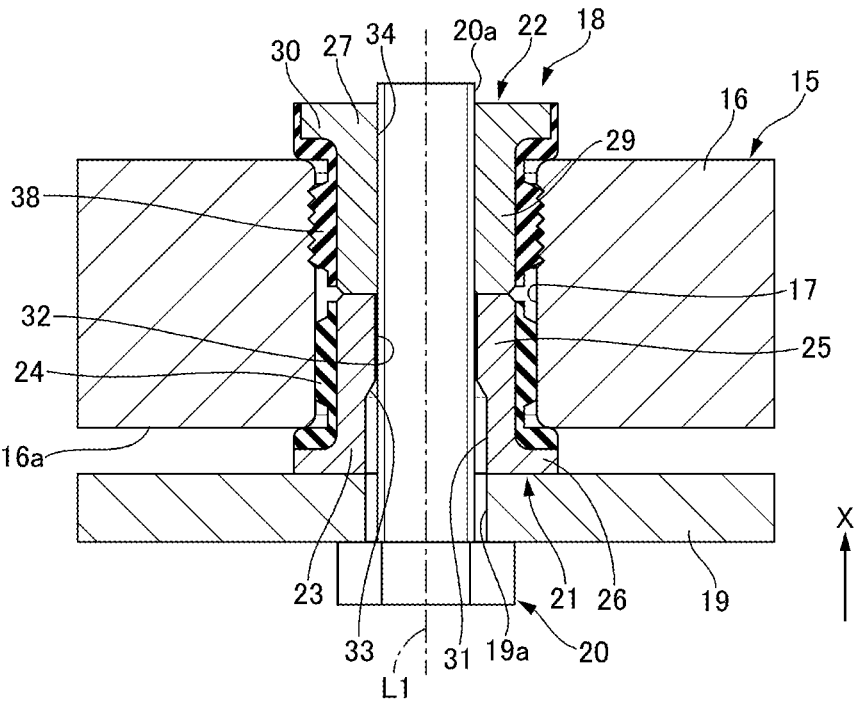
FIG. 6 is a longitudinal sectional view of a bracket portion 15 of Embodiment 5.

FIG. 6 is a longitudinal sectional view of a bracket portion 15 of Embodiment 5.

A knurled portion 38 subjected to knurling processing as non-slip processing is formed in an outer periphery of a second elastic body 28. The knurled portion 38 has a shape in which protruding portions and recessed portions are alternately arranged in an X-axis direction.

Since the non-slip processing is applied to an outer periphery of the second elastic body 28, the bolt 20 can be restrained from thrusting the second insulator 22.

Embodiment 6

Embodiment 6 has a similar basic configuration to Embodiment 1. The following discussion therefore only explains differences from Embodiment 1.

Figure 7:
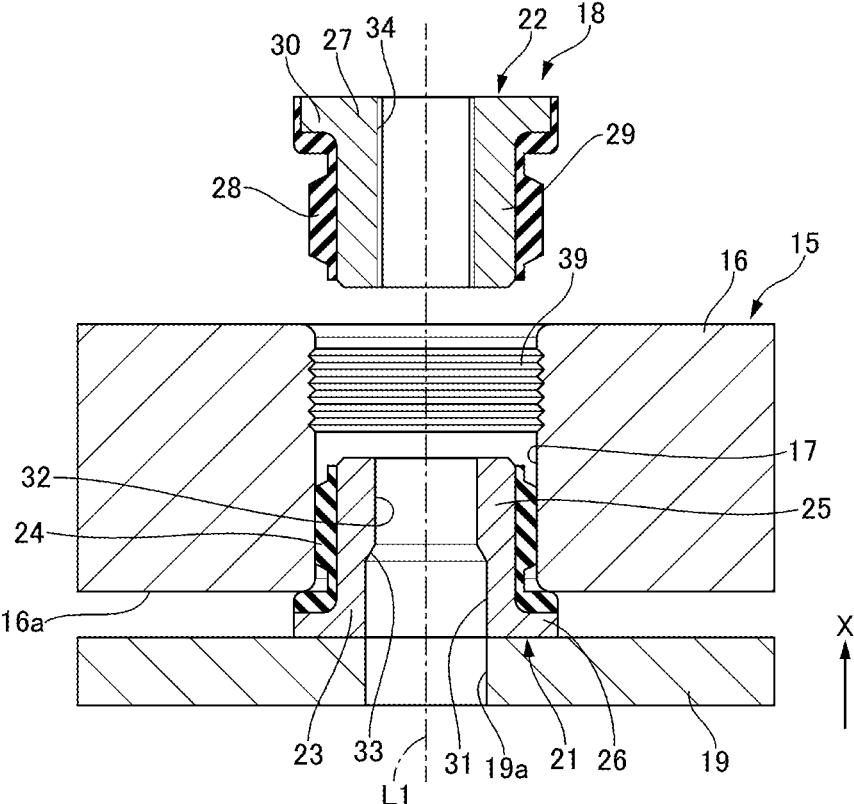
FIG. 7 is a longitudinal sectional view of a bracket portion 15 of Embodiment 6.

FIG. 7 is a longitudinal sectional view of a bracket portion 15 of Embodiment 6 and shows a condition before a second insulator 22 is inserted into an insulator accommodation hole 17.

A knurled portion 39 subjected to knurling processing as non-slip processing is formed in the insulator accommodation hole 17 to be located in a portion contacting a second elastic body 28. The knurled portion 39 has a shape in which protruding portions and recessed portions are alternately arranged in an X-axis direction.

The non-slip processing is applied to the portion of the insulator accommodation hole 17 which contacts the second elastic body 28, which effectively can restrain the bolt 20 from thrusting the second insulator 22.

Embodiment 7

Figure 8:
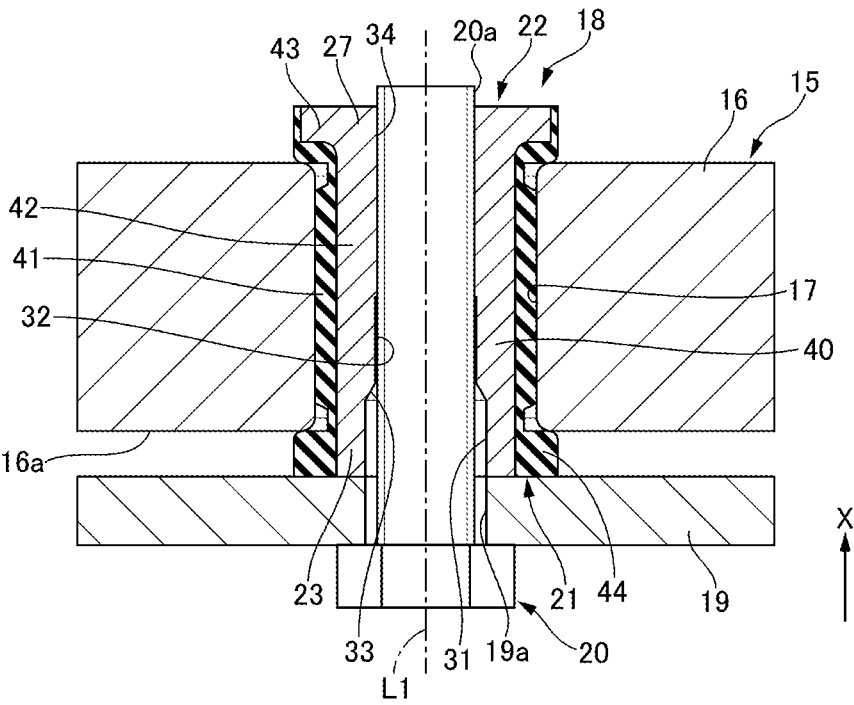
FIG. 8 is a longitudinal sectional view of a bracket portion 15 of Embodiment 7.

FIG. 8 is a longitudinal sectional view of a bracket portion 15 of Embodiment 7.

An insulator 18 of Embodiment 7 includes a core metal 40 and an elastic body 41. The core metal 40 is made of metal material and includes a cylindrical body portion 42 and a flange portion 43. The cylindrical body portion 42 is formed to have a cylindrical shape. The cylindrical body portion 42, except for both ends in an X-axis direction, is accommodated in an insulator accommodation hole 17. The center of the cylindrical body portion 42 is on an axis line L1. The flange portion 43 is protruding from an X-axis positive direction end of the cylindrical body portion 42 in the radially outward direction. The flange portion 43 has an external diameter larger than an internal diameter of the insulator accommodation hole 17.

The elastic body 41 is made of elastic material, such as rubber. The elastic body 41 is radially interposed between the bracket body portion 16 and the cylindrical body portion 42 in an elastically deformed state. The insulator 18 is restrained from falling off the bracket body portion 16 by friction resistance against the bracket body portion 16 which is produced by the elastic deformation of the elastic body 41. A flange portion 44 protruding in the radial direction is provided in an X-axis negative direction end of the elastic body 41. The flange portion 44 is in abutment with a fixed portion 19 of a vehicle body.

A first straight portion 31, an inclined portion 33, a second straight portion 32, and an internal thread portion 34 are provided in an inner periphery of the cylindrical body portion 42 in the order mentioned from an X-axis negative direction side toward an X-axis positive direction side.

The insulator 18 of Embodiment 7 comprises a single core metal 40 and a single elastic body 41. This reduction of the number of components yields more cost savings, as compared to the other embodiments in which the insulators comprise two core metals and elastic bodies.

According to the insulator 18 of Embodiment 7, the thrusting of the bolt 20 against the insulator 18 is less likely to occur due to the flange portion 44 of the elastic body 41. However, if the insulator 18 and the bolt 20 are inclined to each other during the insertion of the bolt 20 into the insulator 18, the external thread portion 20a fails to be engaged with an internal thread portion 34, which makes the bolt 20 spin around. The internal thread portion 34 then might get damaged. The inclined portion 33 is therefore highly effective also for the insulator 18 of Embodiment 7 in restraining the inclination of the bolt 20.

Other Embodiments

Although the embodiments for carrying out the invention have been discussed, the specific configurations of the invention are not limited to the configurations of these embodiments. Alterations in design or the like without deviating the gist of the invention are included in the invention.

The non-slip processing may be performed by any publicly-known method. The shape of the knurled portion may be freely selected.

The following discussion relates to technical ideas that can be understood from the aforementioned embodiments.

A steering device in one mode comprises a rack bar configured to turn a turned wheel; a gear housing made of metal material and including a rack bar accommodating portion and a bracket portion, the rack bar accommodating portion being configured to accommodate the rack bar in a movable manner, the bracket portion including a bracket body portion and an insulator accommodation hole, the bracket body portion being provided at an outer side of the rack bar accommodating portion, the insulator accommodation hole being a through-hole having a circular section, which extends through the bracket body portion; an insulator including a core metal and an elastic portion, the core metal being made of metal material and including a cylindrical body portion and a flange portion, the cylindrical body portion being accommodated in the insulator accommodation hole and including an inner periphery in which an internal thread portion and an inclined portion are formed, the internal thread portion being able to be fastened with a bolt, the inclined portion being provided anterior to the internal thread portion in an inserting direction of the bolt and reduced in diameter toward a rear side in the inserting direction, the flange portion having a shape protruding from the cylindrical body portion in a radially outward direction of the cylindrical body portion and having an external diameter that is formed larger than an internal diameter of the insulator accommodation hole, the elastic portion being made of elastic material and provided between the bracket body portion and the cylindrical body portion in a radial direction of the cylindrical body portion.

Preferably, in the aforementioned mode, the cylindrical body portion includes a straight portion between the internal thread portion and the inclined portion in the inserting direction.

In another preferable mode according to either one of the aforementioned modes, the insulator includes a first insulator and a second insulator. The first insulator includes a first core metal and a first elastic body. The second insulator is provided posterior to the first insulator in the inserting direction and includes a second core metal and a second elastic body. The first core metal includes a first cylindrical body portion and a first flange portion. The second core metal includes a second cylindrical body portion and a second flange portion. The internal thread portion is provided in the second cylindrical body portion. The inclined portion is provided in the first cylindrical body portion.

In still another preferable mode according to any one of the aforementioned modes, the insulator includes a first insulator and a second insulator. The first insulator includes a first core metal and a first elastic body. The second insulator is provided posterior to the first insulator in the inserting direction and includes a second core metal and a second elastic body. The first core metal includes a first cylindrical portion and a first flange portion. The second core metal includes a second cylindrical portion and a second flange portion. The internal thread portion and the inclined portion are provided in the second cylindrical body portion.

In still another preferable mode according to any one of the aforementioned modes, the inclined portion has length that is equal to or larger than half an entire length of the first cylindrical body portion in the inserting direction.

In still another preferable mode according to any one of the aforementioned modes, the inclined portion has an angle smaller than 45 degrees to the inserting direction.

In still another preferable mode according to any one of the aforementioned modes, the first insulator and the second insulator are positioned in a radial direction of the first cylindrical body portion in an abutting state by a first fitted portion and a second fitted portion being fitted to each other.

In still another preferable mode according to any one of the aforementioned modes, the first fitted portion is a convex portion, and the second fitted portion is a concave portion fitted in the convex portion.

In still another preferable mode according to any one of the aforementioned modes, the insulator accommodation hole is subjected to non-slip processing in a portion contacting the second insulator.

In still another preferable mode according to any one of the aforementioned modes, the second elastic body includes an outer periphery that is subjected to non-slip processing.

In still another preferable mode according to any one of the aforementioned modes, the straight portion is provided in the first insulator, and the internal thread portion has a root diameter that is smaller than an internal diameter of the straight portion.

In still another preferable mode according to any one of the aforementioned modes, the inclined portion is provided posterior in the inserting direction to an anterior end face of the bracket body portion in the inserting direction.

In still another preferable mode according to any one of the aforementioned modes, the insulator comprises one core metal and one elastic portion.

The invention is not limited to the aforementioned embodiments and may be modified in various ways. For example, the embodiments are intended to explain the invention in detail to facilitate the understanding of the invention and are not necessarily have to include all the configurations mentioned above. The configuration of any one of the embodiments may be partially replaced with that of another embodiment or may be added to that of another embodiment. The configuration of each of the embodiments may be partially added to, omitted from or replaced with another configuration.

The present application claims priority under Japanese Patent Application No. 2020-156843 filed on Sep. 18, 2020. The entire disclosure of Japanese Patent Application No. 2020-156843 filed on Sep. 18, 2020, including the description, claims, drawings and abstract, is incorporated herein by reference in its entirety.

REFERENCE SIGNS LIST

1 Steering device
2 Steering mechanism
3 Steering assist mechanism
4 Input shaft
5 Output shaft
6 Steering shaft
7 Transmission mechanism
8 Rack bar
9 Gear housing
10 Rack bar accommodating portion
13 Motor
14 Electric Control Unit
15 Bracket portion
16 Bracket body portion
16a End face
17 Insulator accommodation hole
18 Insulator
19 Fixed portion
19a Through-hole
20 Bolt
20a External thread portion
21 First insulator
22 Second insulator
23 First core metal 24 First elastic portion
25 First cylindrical body portion
26 First flange portion
27 Second core metal
28 Second elastic body
29 Second cylindrical body portion
30 Second flange portion
31 First straight portion
32 Second straight portion
33 Inclined portion
34 Thread portion
36 Convex portion (first fitted portion)
37 Concave portion (second fitted portion)
38 Knurled portion
39 Knurled portion
40 Core metal
41 Elastic body
42 Cylindrical body portion
43 Flange portion
44 Flange portion

The invention claimed is:

1. A steering device comprising:

a rack bar configured to turn a turned wheel;

a gear housing made of metal material and including a rack bar accommodating portion and a bracket portion, the rack bar accommodating portion being configured to accommodate the rack bar in a movable manner, the bracket portion including a bracket body portion and an insulator accommodation hole, the bracket body portion being provided at an outer side of the rack bar accommodating portion, the insulator accommodation hole being a through-hole having a circular section, which extends through the bracket body portion;

an insulator including a core metal and an elastic portion, the core metal being made of metal material and including a cylindrical body portion and a flange portion, the cylindrical body portion being accommodated in the insulator accommodation hole and including an inner periphery in which an internal thread portion and an inclined portion are formed, the internal thread portion being able to be fastened with a bolt, the inclined portion being provided anterior to the internal thread portion in an inserting direction of the bolt and reduced in diameter toward a rear side in the inserting direction, the flange portion having a shape protruding from the cylindrical body portion in a radially outward direction of the cylindrical body portion and having an external diameter that is formed larger than an internal diameter of the insulator accommodation hole, the elastic portion being made of elastic material and provided between the bracket body portion and the cylindrical body portion in a radial direction of the cylindrical body portion, wherein the cylindrical body portion includes a straight portion between the internal thread portion and the inclined portion in the inserting direction, wherein the insulator includes a first insulator and a second insulator;

wherein the first insulator includes a first core metal and a first elastic body;

wherein the second insulator is provided posterior to the first insulator in the inserting direction and includes a second core metal and a second elastic body;

wherein the first core metal includes a first cylindrical body portion and a first flange portion;

wherein the second core metal includes a second cylindrical body portion and a second flange portion;

wherein the internal thread portion is provided in the second cylindrical body portion, and wherein the inclined portion is provided in the first cylindrical body portion.

2. The steering device according to claim 1, wherein the inclined portion has length that is equal to or larger than half an entire length of the first cylindrical body portion in the inserting direction.

3. The steering device according to claim 1, wherein the inclined portion has an angle smaller than 45 degrees to the inserting direction.

4. The steering device according to claim 1, wherein the first insulator and the second insulator are positioned in a radial direction of the first cylindrical body portion in an abutting state by a first fitted portion and a second fitted portion being fitted to each other.

5. The steering device according to claim 4, wherein the first fitted portion is a convex portion, and wherein the second fitted portion is a concave portion fitted in the convex portion.

6. The steering device according to claim 1, wherein the insulator accommodation hole is subjected to non-slip processing in a portion contacting the second insulator.

7. The steering device according to claim 6, wherein the second elastic body includes an outer periphery that is subjected to non-slip processing.

8. The steering device according to claim 1, wherein the straight portion is provided in the first insulator, and wherein the internal thread portion has a root diameter that is smaller than an internal diameter of the straight portion.

9. The steering device according to claim 1, wherein the inclined portion is provided posterior in the inserting direction to an anterior end face of the bracket body portion in the inserting direction.

10. The steering device according to claim 1, wherein the insulator comprises one core metal and one elastic portion.

* * * * *